(No Model.)

J. G. AVERY.
ANTI FRICTION BEARING.

No. 267,991. Patented Nov. 28, 1882.

WITNESSES
Wm. A. Skinkle
H. W. Elmore

INVENTOR
John G. Avery,
By his Attorney
Jas. L. Ewin.

UNITED STATES PATENT OFFICE.

JOHN G. AVERY, OF SPENCER, MASSACHUSETTS.

ANTI-FRICTION BEARING.

SPECIFICATION forming part of Letters Patent No. 267,991, dated November 28, 1882.

Application filed May 5, 1882. (No model.)

*To all whom it may concern:*

Be it known that I, JOHN G. AVERY, a citizen of the United States, residing at Spencer, in the State of Massachusetts, have invented a new and useful Improvement in Anti-Friction Bearings, of which the following is a specification.

This invention relates to bearings for line-shafting and like horizontal rotary parts of machinery having horizontal axes, which require long bearings, but may be sufficiently supported by a single series of "hardened" anti-friction rollers, coacting with "hardened surfaces," provided the rollers be properly distributed and guarded against displacement and binding.

The present invention consists, first, in what I term a "long-roll shell," of improved construction; and, secondly, in a novel combination of parts, including said long-roll shell, constituting my improved anti-friction bearing for line-shafting, as hereinafter described and claimed, the objects of my invention being the preclusion at once of disarrangement and binding of rollers of any required length, and the facilitation of constructing such bearings and applying them at any point to line-shafting.

Figure 1:
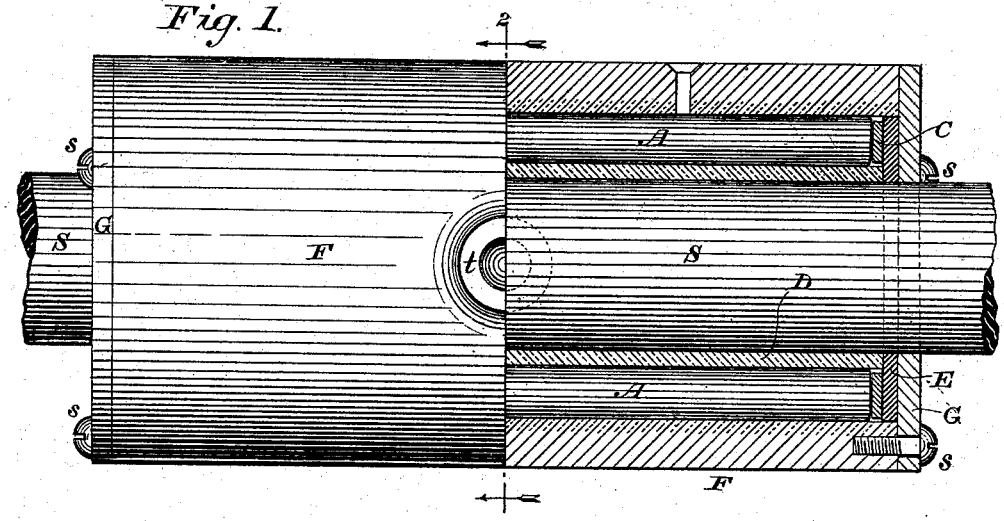
Figure 2:
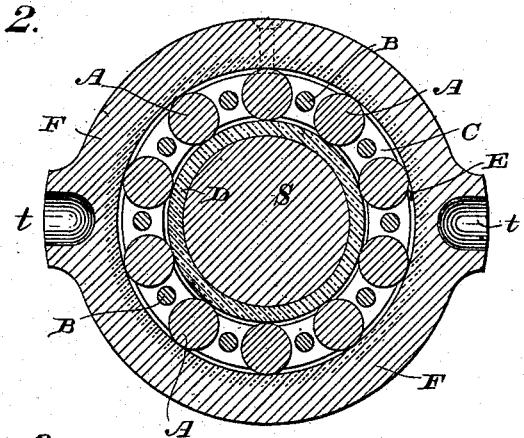
Figure 3:
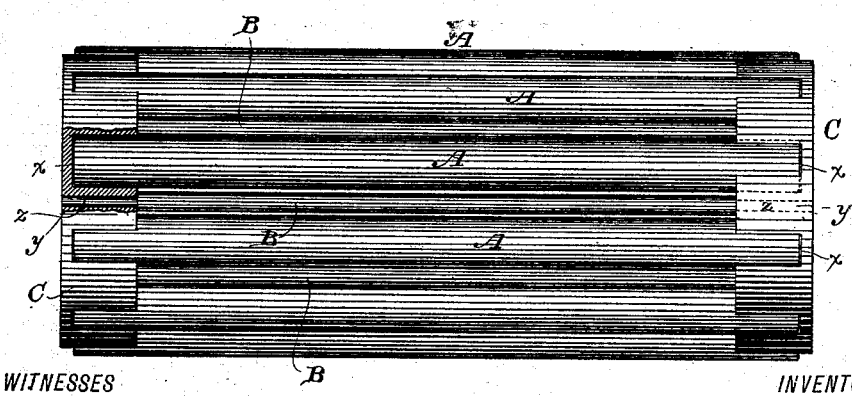

In the accompanying drawings, Figure 1 is a half side view and half longitudinal section of my said anti-friction bearing for line-shafting. Fig. 2 is a transverse section on the line 2 2, Fig. 1; and Fig. 3 is an elevation of my said long-roll shell with one of its end rings partly in section, like letters of reference indicating corresponding parts in the several figures.

My said long-roll shell is composed of ten (or it may be more or less) smooth cylindrical rollers, A, of hardened steel or like hard and durable material, a like number of shouldered rods, B, which may be of iron, and a pair of end rings, C, preferably of suitable brass, drilled to receive the ends of said rollers and rods, and permanently and rigidly united by the latter. The rollers A are "journalless"— that is to say, they have neither spindles nor trunnions—but their ends are preferably "rounded," as shown, to keep them from cutting or scraping. They may be as long as may be required, being made of sufficient diameter to insure the preservation of absolute trueness, which is essential. The rods B should be perfectly straight, and of sufficient thickness to unitedly render the shell rigid without unnecessarily occupying roller-space. Their shoulders are located with uniformity at the inner extremities of reduced ends, one of which is exposed at $z$ in Fig. 3. The length of these, with the corresponding width of the rings C, is determined by the demands of a secure and rigid union between said rods as a whole and said rings, while said shoulders, located with reference to the relative length of the rollers, preclude binding the latter in driving on the last ring by powerful endwise pressure, and serve to insure parallelism throughout the structure. The end rings, C, are provided with drill-holes tightly fitted to said rod ends, as shown at $y$, Fig. 3, and with "chambers" or cells $x$, Fig. 3, for the ends of the rollers, being made of sufficient thickness to preclude the escape of the roller ends from the latter in either direction, while exposing the same properly and permitting them to rotate freely. The respective pairs of said cells $x$ of the rings C, being kept in line by the shouldered ends $z$ of the rods B, serve to keep the rollers A parallel to each other and to the axis of the shell, while the shell as a whole, once finished, is handled, applied, and removed as a single part with the utmost facility.

The other parts of my said bearing for line-shafting are a sleeve, D, of hardened metal, with a smooth cylindrical outer surface, and a pair of packing-rings, E, preferably of compressed leather, fitted to the shafting S, Figs. 1 and 2, and an internally-chilled metallic outer shell, F, into which said long-roll shell is fitted, said sleeve D being fitted to the interior of the latter, with a pair of cap-rings, G, attached to the ends of said outer shell by screws $s$, Fig 1. Said sleeve D provides the shafting with the requisite hard surface to coact with the rollers A at any point, and need simply be truly fitted and slipped into position, as the least friction between the shafting and sleeve is sufficient to insure their rotation together. Said rings E coact with the ends of said long-roll shell—to wit, with the end rings, C—and with the ends of the sleeve D, precluding endwise displacement of either, while they serve also to exclude dust. The outer shell, F, has been constructed with horizontal trunnions t, by which to support the same in an approved form of hanger.

Having thus described my said invention, I claim as new and desire to secure by Letters Patent—

1. In an anti-friction bearing, a long-roll shell composed of cylindrical rollers, shouldered rods, and a pair of end rings drilled to receive the tightly-driven reduced ends of said rods, and provided with cells to retain and expose the ends of said rollers, as herein specified, for the purposes set forth.

2. The combination of the cylindrical rollers A, shouldered rods B, end rings, C, hardened sleeve D, packing-rings E, internally-hardened outer shell, F, and cap-rings G, substantially as shown, for providing line-shafting with a long-roll anti-friction bearing at any point, as herein set forth.

3. The mode of applying a long-roll anti-friction bearing to line-shafting at any point, substantially as hereinbefore specified.

JOHN G. AVERY.

Witnesses:
EMERSON STONE,
E. M. WILSON.